(12) United States Patent
Siohan et al.

(10) Patent No.: US 12,334,054 B2
(45) Date of Patent: Jun. 17, 2025

(54) RESCORING AUTOMATIC SPEECH RECOGNITION HYPOTHESES USING AUDIO-VISUAL MATCHING

(71) Applicant: Google LLC, Mountain View, CA (US)

(72) Inventors: Olivier Siohan, Mountain View, CA (US); Takaki Makino, Mountain View, CA (US); Richard Rose, Mountain View, CA (US); Otavio Braga, Mountain View, CA (US); Hank Liao, Mountain View, CA (US); Basilio Garcia Castillo, Mountain View, CA (US)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 17/755,972

(22) PCT Filed: Nov. 18, 2019

(86) PCT No.: PCT/US2019/061967
§ 371 (c)(1),
(2) Date: May 12, 2022

(87) PCT Pub. No.: WO2021/101500
PCT Pub. Date: May 27, 2021

(65) Prior Publication Data
US 2022/0392439 A1   Dec. 8, 2022

(51) Int. Cl.
| | | |
|---|---|---|
| *G10L 13/08* | (2013.01) | |
| *G06V 10/774* | (2022.01) | |
| *G06V 20/40* | (2022.01) | |
| *G06V 40/16* | (2022.01) | |
| *G10L 13/02* | (2013.01) | |
| *G10L 15/06* | (2013.01) | |
| *G10L 15/08* | (2006.01) | |
| *G10L 15/22* | (2006.01) | |

(Continued)

(52) U.S. Cl.
CPC ........ *G10L 15/083* (2013.01); *G06V 10/774* (2022.01); *G06V 20/46* (2022.01);
(Continued)

(58) Field of Classification Search
None
See application file for complete search history.

(56) References Cited

U.S. PATENT DOCUMENTS 5,970,459 A * 10/1999 Yang ................... G06F 16/4393
704/E21.02
6,088,673 A *  7/2000 Lee ......................... G10L 13/00
704/278

(Continued)

FOREIGN PATENT DOCUMENTS

JP      200192974 A     4/2001
WO    2011130083 A2    10/2011

OTHER PUBLICATIONS

1 Cutler R et al "Look who's talking: Speaker detection using video and audio correlation" Jul. 2000.
(Continued)

*Primary Examiner* — Jakieda R Jackson
(74) *Attorney, Agent, or Firm* — Honigman LLP; Brett A. Krueger; Grant Griffith

(57) ABSTRACT

A method (400) includes receiving audio data (112) corresponding to an utterance (101) spoken by a user (10), receiving video data (114) representing motion of lips of the user while the user was speaking the utterance, and obtaining multiple candidate transcriptions (135) for the utterance based on the audio data. For each candidate transcription of the multiple candidate transcriptions, the method also includes generating a synthesized speech representation (145) of the corresponding candidate transcription and determining an agreement score (155) indicating a likelihood that the synthesized speech representation matches the motion of the lips of the user while the user speaks the utterance. The method also includes selecting one of the multiple candidate transcriptions for the utterance as a speech recognition
(Continued)

output (175) based on the agreement scores determined for the multiple candidate transcriptions for the utterance.

26 Claims, 6 Drawing Sheets

(51) Int. Cl.
    *G10L 15/25*      (2013.01)
    *G10L 15/30*      (2013.01)
    *G10L 25/57*      (2013.01)

(52) U.S. Cl.
    CPC ............ *G06V 40/171* (2022.01); *G10L 13/02* (2013.01); *G10L 15/063* (2013.01); *G10L 15/22* (2013.01); *G10L 15/25* (2013.01); *G10L 15/30* (2013.01); *G10L 25/57* (2013.01)

(56) References Cited

U.S. PATENT DOCUMENTS

| | | | |
|---|---|---|---|
| 6,975,991 B2* | 12/2005 | Basson | A61F 11/04 704/271 |
| 7,761,296 B1 | 7/2010 | Bakis et al. | |
| 8,521,533 B1* | 8/2013 | Ostermann | G10L 15/26 704/278 |
| 10,573,312 B1* | 2/2020 | Thomson | G10L 15/22 |
| 2002/0024519 A1* | 2/2002 | Park | G06T 13/40 345/473 |
| 2003/0018475 A1 | 1/2003 | Basu et al. | |
| 2005/0042591 A1* | 2/2005 | Bloom | G11B 27/34 434/308 |
| 2011/0125499 A1* | 5/2011 | Griggs | G10L 15/183 704/E15.001 |
| 2011/0257971 A1 | 10/2011 | Morrison | |
| 2018/0268812 A1* | 9/2018 | Kim | G10L 15/22 |
| 2019/0251970 A1 | 8/2019 | Shukla et al. | |

OTHER PUBLICATIONS

JPO. Office Action relating to Japan Application No. 2022-528637, dated Dec. 6, 2022.
Ross Cutler, et al., "Look Who's Talking: Speaker Detection Using Video and Audio Correlation", ICME 2000, IEEE, Aug. 2000, pp. 1589-1592.
Chinese Office Action for the related application No. 201980102308.8 .

* cited by examiner

RESCORING AUTOMATIC SPEECH RECOGNITION HYPOTHESES USING AUDIO-VISUAL MATCHING

TECHNICAL FIELD

This disclosure relates to rescoring automatic speech recognition (ASR) hypotheses using audio-visual matching.

BACKGROUND

Automatic speech recognition (ASR) is a technology typically used in mobile devices and other devices. In general, automatic speech recognition attempts to provide accurate transcriptions of what a person has said. In noisy environments, or otherwise when audio quality of a recorded utterance is poor, obtaining accurate ASR results can be a difficult task. When video data of a speaker is available, the video data can be leveraged to help improve ASR results. For instance, the video data of the speaker may provide motion of the lips while the speaker is speaking an utterance, which in turn, can be combined with the audio data of the utterance to assist in processing an ASR result.

SUMMARY

One aspect of the disclosure provides a method for rescoring automatic speech recognition (ASR) hypotheses using audio-visual matching. The method includes receiving, at data processing hardware, audio data corresponding to an utterance spoken by a user and video data representing motion of lips of the user while the user was speaking the utterance. The method also includes obtaining, by the data processing hardware, multiple candidate transcriptions for the utterance based on the audio data. For each candidate transcription of the multiple candidate transcriptions for the utterance, the method includes generating, by the data processing hardware, a synthesized speech representation of the corresponding candidate transcription; and determining, by the data processing hardware, an agreement score indicating a likelihood that the synthesized speech representation of the corresponding candidate transcription matches the motion of the lips of the user while the user speaks the utterance. The method also includes selecting, by the data processing hardware, one of the multiple candidate transcriptions for the utterance as a speech recognition output based on the agreement scores determined for the multiple candidate transcriptions for the utterance.

Implementations of the disclosure may include one or more of the following optional features. In some implementations, determining the agreement score includes providing, to an agreement score model, the synthesized speech representation of the corresponding candidate transcription and the video data representing the motion of the lips of the user as feature inputs and determining, from the agreement score model, as a feature output, the agreement score based on a degree that the synthesized speech representation of the corresponding candidate transcription matches with the motion of the lips of the user. In these implementations, the agreement score model is trained on a plurality of training examples including positive training examples and negative training examples. The positive training examples include audio data representing utterances of speech and video data representing motion of lips of speakers that match the utterances of speech, while the negative training examples include audio data representing utterances of speech and video data representing motion of lips of speakers that do not match the utterances of speech.

In some examples, selecting one of the multiple candidate transcriptions for the utterance as the speech recognition output includes selecting, from among the multiple candidate transcriptions for the utterance, the candidate transcription associated with the highest agreement score as the speech recognition output for the utterance.

In some implementations, obtaining the multiple candidate transcriptions for the utterance includes generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct. The implementation further includes ranking the candidate transcriptions in the initial set of candidate transcriptions based on the likelihood scores, and determining the multiple candidate transcriptions for the utterance as the N-candidate transcriptions in the initial set of candidate transcriptions associated with the highest likelihood scores, the identified multiple candidate ranked according to the associated likelihood scores. In these implementations, the method may further include, prior to selecting one of the multiple transcriptions for the utterance, re-ranking, by the data processing hardware, the multiple candidate transcriptions for the utterance based on the agreement scores determined for the multiple candidate transcriptions for the utterance.

In some examples, obtaining the multiple candidate transcriptions for the utterance includes generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct. In these examples, the method further includes identifying two or more candidate transcriptions in the initial set of candidate transcriptions that are associated with likelihood scores that satisfy a likelihood threshold, and determining the multiple candidate transcriptions for the utterance as the identified two or more candidate transcriptions in the initial set of candidate transcriptions that are associated with likelihood scores that satisfy the likelihood threshold.

In some implementations, the multiple candidate transcriptions for the utterance are associated with the same language. In other examples, at least one of the multiple candidate transcriptions for the utterance is associated with a different language than the other multiple candidate transcriptions.

In some examples, receiving the audio data corresponding to the utterance spoken by the user includes receiving the audio data from a client device associated with the user, the client device in communication with one or more audio capture devices configured to capture the audio data corresponding to the utterance. In these examples, the data processing hardware resides on the client device. In other examples, client device is remote from the data processing hardware and communicates with the data processing hardware via a network.

In some implementations, receiving the video data representing the motion of the lips of the user while the user was speaking the utterance includes receiving the video data from the client device associated with the user. In these implementations, the client device includes one or more video capture devices configured to record the video data representing the motion of the lips of the user while the user was speaking the utterance.

Another aspect of the disclosure provides a system for rescoring (ASR) hypotheses using audio-visual matching. The system includes data processing hardware and memory hardware in communication with the data processing hardware. The memory hardware stores instructions that when executed by the data processing hardware cause the data processing hardware to perform operations that include receiving audio data corresponding to an utterance spoken by a user and video data representing motion of lips of the user while the user was speaking the utterance. The operations further include obtaining multiple candidate transcriptions for the utterance based on the audio data. For each candidate transcription of the multiple candidate transcriptions for the utterance, the operations include generating a synthesized speech representation of the corresponding candidate transcription and determining an agreement score indicating a likelihood that the synthesized speech representation of the corresponding candidate transcription matches the motion of the lips of the user while the user speaks the utterance. The operations further include selecting one of the multiple candidate transcriptions for the utterance as a speech recognition output based on the agreement scores determined for the multiple candidate transcriptions for the utterance.

Implementations of the disclosure may include one or more of the following optional features. In some implementations, determining the agreement score includes providing, to an agreement score model, the synthesized speech representation of the corresponding candidate transcription and the video data representing the motion of the lips of the user as feature inputs and determining, from the agreement score model, as a feature output, the agreement score based on a degree that the synthesized speech representation of the corresponding candidate transcription matches the motion of the lips of the user. In these examples, the agreement score model is trained on a plurality of training examples including positive training examples and negative training examples. The positive training examples include audio data representing utterances of speech and video data representing motion of lips of speakers that match the utterances of speech; and the negative training examples include audio data representing utterances of speech and video data representing motion of lips of speakers that do not match the utterances of speech.

In some examples, selecting one of the multiple candidate transcriptions for the utterance as the speech recognition output includes selecting, from among the multiple candidate transcriptions for the utterance, the candidate transcription associated with the highest agreement score as the speech recognition output for the utterance.

In some implementations, obtaining the multiple candidate transcriptions for the utterance includes generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct. In these implementations, the operations further include ranking the candidate transcriptions in the initial set of candidate transcriptions based on the likelihood scores, and determining the multiple candidate transcriptions for the utterance as the N-candidate transcriptions in the initial set of candidate transcriptions associated with the highest likelihood scores, the identified multiple candidate ranked according to the associated likelihood scores. The operations may further include, prior to selecting one of the multiple transcriptions for the utterance, re-ranking, by the data processing hardware, the multiple candidate transcriptions for the utterance based on the agreement scores determined for the multiple candidate transcriptions for the utterance.

In some examples, obtaining the multiple candidate transcriptions for the utterance includes generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct. In these examples, the operations further include identifying two or more candidate transcriptions in the initial set of candidate transcriptions that are associated with likelihood scores that satisfy a likelihood threshold, and determining the multiple candidate transcriptions for the utterance as the identified two or more candidate transcriptions in the initial set of candidate transcriptions that are associated with likelihood scores that satisfy the likelihood threshold.

In some implementations, the multiple candidate transcriptions for the utterance are associated with the same language. In other examples, at least one of the multiple candidate transcriptions for the utterance is associated with a different language than the other multiple candidate transcriptions.

In some examples, receiving the audio data corresponding to the utterance spoken by the user includes receiving the audio data from a client device associated with the user, the client device in communication with one or more audio capture devices configured to capture the audio data corresponding to the utterance. In these examples, the data processing hardware resides on the client device. In other examples, client device is remote from the data processing hardware and communicates with the data processing hardware via a network.

In some implementations, receiving the video data representing the motion of the lips of the user while the user was speaking the utterance includes receiving the video data from the client device associated with the user. In these implementations, the client device includes one or more video capture devices configured to record the video data representing the motion of the lips of the user while the user was speaking the utterance.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
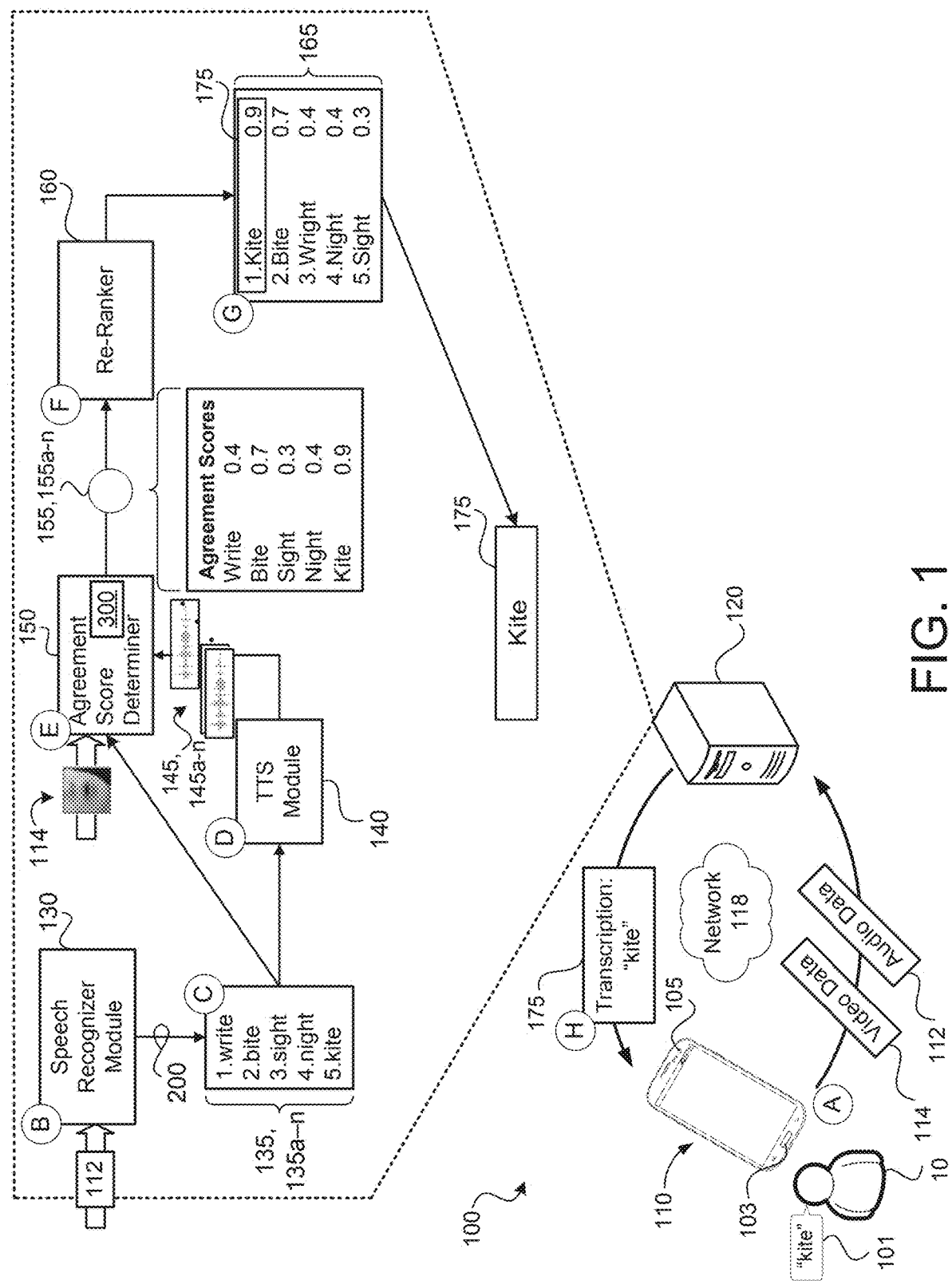
FIG. 1 is a schematic view of an example system for automatic speech recognition using both audio data and visual data.

The present disclosure provides a computer-implemented method which improves automated speech recognition (ASR) in relation to an utterance spoken by a user. The utterance may, for example, relate to a user speaking to a digital assistant on a user device such as a smart phone, smart speaker, or smart display. Audio data of the utterance is used to generate multiple candidate transcriptions (e.g., also referred to as "transcription hypotheses" or "ASR result hypotheses) for the utterance, thereby enabling generation of synthesized speech representations of the multiple candidate transcriptions (e.g. using a text-to-speech system). Video data of the user's face and/or lips whilst speaking the utterance may then be used to score or rank each of the synthesized speech representations based on how well each synthesized speech representation matches the video data (i.e. based on how well each synthesized speech representation matches the motion/movement of the user's face and/or lips in the video data). In this way, a speech recognition output may be selected based on the candidate transcription corresponding to the synthesized speech representation which best matches the video data.

One technical effect of this method (as compared to a method which relies solely on audio data) is to improve selection of the speech recognition output. In other words, the present methodology makes it more likely that the correct speech recognition output (i.e., an accurate transcription of the user utterance) will be selected. Effectively, the video data is used as an additional source of data to validate/verify/enhance the output of an audio-based automated speech recognition system. Thus, when video data of the user speaking the utterance is available, this video data may be used to determine which of the multiple candidate transcriptions is most likely to be correct, thereby improving the accuracy of the speech recognition system. The present methodology solves the technical problem of how to improve an audio-based automated speech recognition system. This is achieved here by using the video data to score or rank options produced using audio data only.

Another technical effect of the present methodology is improved identification of the language of an utterance. In particular, if the language of the utterance is unknown, the multiple candidate transcriptions may be generated in multiple languages. In this case, the language of the utterance may be identified based on the selected speech recognition output. Since the video data has been used to determine the best-matching synthesized speech representation, it is more likely that the associated candidate transcription will be in the correct language.

In some cases, it is envisaged that the audio data analysis is performed in the cloud (i.e., remote from the user device), with the subsequent video data matching done on the user device itself. One technical effect of this arrangement is a reduced bandwidth requirement since the video data may be retained on the user device without the need to transmit it to the remote cloud server. If the video data were to be transmitted to the cloud, it is likely that it would first need to be compressed for transmission. Therefore, another technical effect of performing the video matching on the user device itself is that the video data matching may be performed using the uncompressed (highest quality) video data. The use of uncompressed video data makes it easier to recognize matches/mismatches between the synthesized speech representations and the video data. Thus, improved scores/ranks are to be expected, thereby making it even more likely that the correct speech recognition output will be selected.

In some examples, it is envisaged that the degree of match between the synthesized speech representations and the video data be measured using a system (e.g. a deep neural network) trained on a large collection of audio-visual samples. In one example, the training examples/samples include both positive training examples/samples including audio data representing utterances of speech and video data representing motion of lips of speakers that match the utterances of speech, and negative training examples/ samples including audio data representing utterances of speech and video data representing motion of lips of speakers that do not match the utterances of speech. Such training data ensures that the system is trained to recognize both matches and mismatches between the synthesized speech representations and the video data, thereby improving the accuracy of the system.

FIG. 1 is a block diagram that illustrates an example of a system 100 for automatic speech recognition of an utterance 101 spoken by a user 10 using audio data 112 corresponding to the utterance 101 and video data 114 representing motion of lips of the user 10 while the user 10 was speaking the utterance 101. The system 100 includes a client device 110, a computing system 120, and a network 118. In the example, the computing system 120 receives audio data 112 and video data 114 from the client device 110, and the computing system 120 obtains multiple candidate transcriptions 135, 135a-n for the utterance 101 based on the audio data 112. As used herein, the terms "candidate transcription" and "transcription hypothesis" may be used interchangeably. As described in greater detail below, for each candidate transcription 135, the computing system 120 is configured to generate a synthesized speech representation 145 of the corresponding candidate transcription 135 and use the video data 114 to determine an agreement score 155 indicating a likelihood that the synthesized speech representation 145 of the corresponding candidate transcription 135 matches the motion of the lips of the user 10 while speaking the utterance 101. Thereafter, the computing system 120 may select one of the multiple candidate transcriptions 135 for the utterance as a speech recognition output 175 based on the agreement scores 155 determined for the multiple candidate transcriptions 135 for the utterance 101. FIG. 1 shows stages (A) to (H) which illustrate a flow of data.

The client device 110 can be, for example, a desktop computer, a laptop computer, a smart phone, a smart speaker, a smart display, a tablet computer, a music player, an e-book reader, or a navigation system. The client device 110 includes one or more audio capture devices (e.g., microphone(s)) 103 configured to record utterances 101 spoken by the user 10 and one or more video image/video capture devices (e.g., camera(s)) 105 configured to capture image/ video data 114 representing motion of the lips of the user 10 while the user 10 speaks the utterance 101. In some examples, the microphone 103 or the camera 105 is separate from the client device 110 and in communication with the client device 110 to provide the recorded utterance 101 or the captured image/video data 114 to the client device 110. The functions performed by the computing system 120 can be performed by individual computer systems or can be distributed across multiple computer systems. The network 118 can be wired or wireless or a combination of both, and may include private networks and/or public networks, such as the Internet.

As will become apparent, video data 114 representing motion of the lips of the user 10 while the user 10 is speaking can be used to improve speech recognition accuracy by re-scoring and re-ranking the multiple candidate transcriptions 135 obtained for the utterance 101 based on the audio data 112 alone. For example, after a set of candidate transcriptions 135 are obtained for an utterance 101, further processing may be done for a set of the n-best candidate transcriptions 135, 135a-n, where n is an integer (e.g., the 3, 5, or 10 most likely transcriptions). Thus, rather than accepting the candidate transcription 135 that a speech recognizer module 130 indicates is most likely based on audio data alone, the video data 114 can be leveraged to re-score and re-rank 1s the set of n-best candidate transcriptions 135.

For example, the speech recognizer module 130 may employ a language model that is broad enough to model naturally spoken utterances, but may not be able to disambiguate between acoustically confusable sentences such as "I say" and "Ice Age" However, by comparing the video data representing motion of the user's 10 lips to synthesized speech representations 145 of candidate transcriptions 135 to determine agreement scores 155 for the candidate transcriptions 135, the sentence "Ice Age" including a higher agreement score 155 than the agreement score 155 for "I say" may indicate that it is more likely that the user 10 uttered "Ice Age" and not "I say".

Each of the n-best candidate transcriptions 135 can be provided as a synthesized speech representation 145 of the corresponding candidate transcription 135. Agreement scores 155 for each of the n-best candidate transcriptions 135 are analyzed, for example, to determine how well each synthesized speech representation 145 of the corresponding candidate transcription 135 matches the video data 114 representing the motion of the lips of the user 10 while speaking the utterance 101 for which the candidate transcriptions 135 are obtained. The agreement score 155 for each corresponding candidate transcription 135 can indicate a degree of likelihood that each candidate transcription is correct, e.g., based on a likelihood that the synthesized speech representation 145 of the corresponding candidate transcription 135 matches the motion of the lips of the user 10 while the user 10 speaks the utterance 101. If a candidate transcription 135 has a low agreement score 155 (e.g., the agreement score 155 is less than an agreement score threshold), the candidate transcription 135 is unlikely to be a correct transcription for the utterance 101. On the other hand, if a candidate transcription 135 has a high agreement score 155 (e.g., the agreement score 155 is greater than or equal to the agreement score threshold), the candidate transcription 135 is more likely to be correct. Accordingly, the agreement scores 155 based on the video data 114 and the synthesized speech representations 145 of the candidate transcriptions 135 may be used to re-rank the n-best candidate transcriptions 135 obtained by the speech recognizer module 130 based on the audio data 112 alone.

In the example of FIG. 1, during stage (A), the user 10 speaks an utterance 101, and the microphone 103 of the client device 110 records the utterance 101. For instance, the utterance 101 may include the user 10 speaking the term "kite" Simultaneously, the camera 105 captures the video data 114 representing the motion of the lips of the user 10 while the user 10 speaks the utterance 101. Thereafter, the client device 110 transmits the audio data 112, corresponding to the utterance 101 recorded by the microphone 103, and the video data 114, captured by the camera 105, to the computing system 120 via the network 118.

During stage (B), the computing system 120 receives the audio data 112 and obtains multiple candidate transcriptions 135 for the utterance 101 based on the audio data 112. For example, the computing system 120 may include the speech recognizer module 130 (e.g., an automated speech recognition (ASR) module) for producing a word lattice 200 indicating the multiple candidate transcriptions 135 that may be possible for the utterance 101 based on the audio data 112.

Figure 2A:
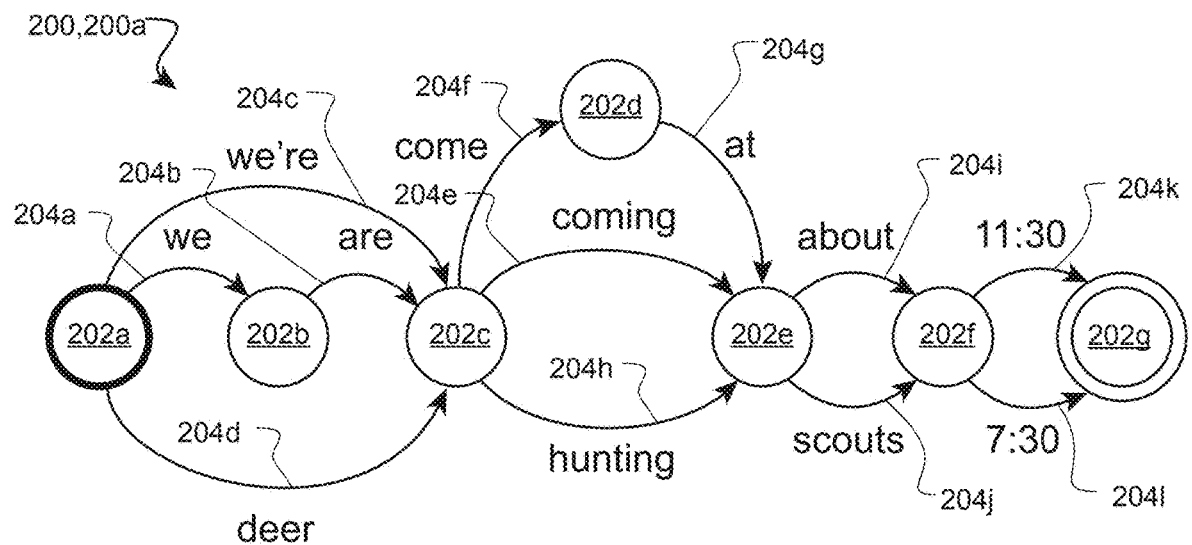
FIGS. 2A and 2B are schematic views of diagrams that illustrate examples of word lattices.

FIG. 2A is an example of a word lattice 200, 200a that may be provided by the speech recognizer module 130 of FIG. 1. The word lattice 200a represents multiple possible combinations of words that may form different candidate transcriptions 135 for an utterance 101.

The word lattice 200a includes one or more nodes 202a-g that correspond to the possible boundaries between words. The word lattice 200a includes multiple edges 204a-1 for the possible words in the transcription hypotheses (e.g., candidate transcription 135) that result from the word lattice 200a. In addition, each of the edges 204a-1 can have one or more weights or probabilities of that edge being the correct edge from the corresponding node. The weights are determined by the speech recognizer module 130 and can be based on, for example, a confidence in the match between the speech data and the word for that edge and how well the word fits grammatically and/or lexically with other words in the word lattice 200a.

For example, initially, the most probable path (e.g., most probable candidate transcription 135) through the word lattice 200a may include the edges 204c, 204e, 204i, 204k, which have the text "we're coming about 11:30." A second 1s best path (e.g., second best candidate transcription) may include the edges 204d, 204h, 204j, 304l, which have the text "deer hunting scouts 7.30."

Each pair of nodes may have one or more paths corresponding to the alternate words in the various candidate transcriptions 135. For example, the initial most probable path between the node pair beginning at the node 202a and ending at the node 202c is the edge 204c "we're." This path has alternate paths that include the edges 24a-b "we are" and the edge 204d "deer."

Figure 2B:
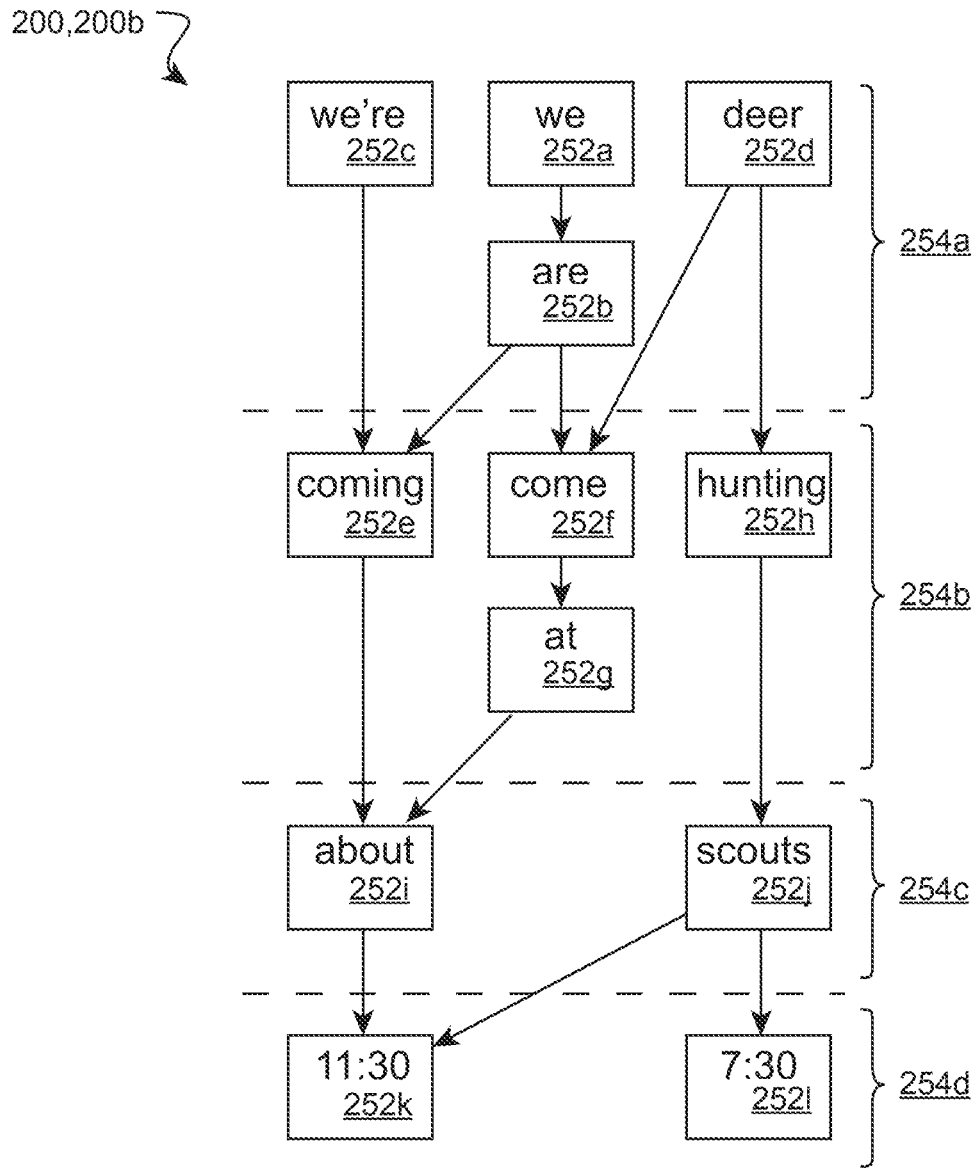

FIG. 2B is an example of a hierarchical word lattice 200, 200b that may be provided by the speech recognizer module 130 of FIG. 1. The word lattice 200b includes nodes 252a-l that represent the words that make up the various candidate transcriptions 135 for an utterance 101. The edges between the nodes 252a-1 show that the possible candidate transcriptions include: (1) the nodes 252c, 252e, 252i, 252k "we're coming about 11.30", (2) the nodes 252a, 252b, 252e, 252i, 252k "we are coming about 11:30"; (3) the nodes 252a, 252b, 252f, 252g, 252i, 252k "we are come at about 11.30". (4) the nodes 252d, 252f, 252g, 252i, 252k "deer come at about 11:30"; (5) the nodes 252d, 252h, 252j, 252k "deer hunting scouts 11:30"; and (6) the nodes 252d, 252h, 252j, 252l "deer hunting scouts 730."

Again, the edges between the nodes 252a-l may have associated weights or probabilities based on the confidence in the speech recognition and the grammatical/lexical analysis of the resulting text. In this example, "we're coming about 11:30" may currently be the best hypothesis and "deer hunting scouts 7:30" may be the next best hypothesis. One or more divisions, 254a-d, can be made in the word lattice 200b that group a word and its alternates together. For example, the division 254a includes the word "we're" and the alternates "we are" and "deer". The division 254b includes the word "coming" and the alternates "come at" and "hunting". The division 254c includes the word "about"

and the alternate "scouts" and the division 254d includes the word "11-30" and the alternate "7-30."

Referring back to FIG. 1, the speech recognizer module 130 may use an acoustic model and language model to generate the word lattice 200 or otherwise 1s identify the multiple candidate transcriptions 135 for the utterance 101 based on the audio data 112. The speech recognizer module 130 may also indicate which of the candidate transcriptions 135 the speech recognizer module 130 considers most likely to be correct, for example, by providing likelihood scores and/or ranking for the candidate transcriptions 135.

During stage (C), the computing system 120 identifies a set of highest-ranking candidate transcriptions 135 from within the set of candidate transcriptions received in the word lattice 200. For example, using likelihood scores or ranking information from the speech recognizer module 130, the computing system 120 may select n candidate transcriptions 135 with the highest likelihoods, where n is an integer. In the illustrated example, the top five candidate transcriptions (e.g., the five that are indicated as most likely to be correct) are selected as the set of highest-ranking candidate transcriptions 135, 135a-n. In the example shown, the set of highest-ranking candidate transcriptions 135 include the words "write", "bite", "sight", "night", and "kite" ranked in order from highest to lowest. Notably, the candidate transcription 135 of "kite" is ranked last even though this is the word actually spoken by the user 10 in the recorded utterance 101. Put another way, if the highest ranking candidate transcription 135 output from the speech recognizer module 130 were selected as a speech recognition result, the word "write" would be selected in error over the word "kite."

In some examples, the speech recognizer module 130 generates an initial set of candidate transcriptions 135 for the utterance 101 based on the audio data 112, whereby each candidate transcription 135 in the initial set is associated with a corresponding likelihood score indicating a likelihood that the candidate transcription 135 is correct. Thereafter, the speech recognizer module 130 ranks the candidate transcriptions 135 in the initial set based on the likelihood scores (e.g., from most to least likely) and stage (C) determines the multiple candidate transcriptions 135 for the utterance as the N-candidate transcriptions 135 in the initial set of candidate transcriptions associated with the highest likelihood scores. Here, the identified multiple candidate transcriptions 135a-n are ranked according to the associated likelihood scores.

In additional examples, after the speech recognizer module 130 generates the initial set of candidate transcriptions 135, the speech recognizer module 130 identifies two or more candidate transcriptions 135 in the initial set that are associated with likelihood scores that satisfy a likelihood threshold. Here, stage (C) determines the multiple candidate transcriptions 135a-n for the utterance as the identified two or more candidate transcriptions 135 in the initial set that are associated with likelihood scores that satisfy the likelihood threshold. In these examples, candidate transcriptions 135 associated with low likelihood scores are eliminated from consideration.

During stage (D), the computing system 120 provides each candidate transcription 135 to a text-to-speech (TTS) module 140 (e.g., a speech synthesizer or speech synthesis module). For each candidate transcription 135a-n identified at stage (C), the TTS module 140 is configured to generate a synthesized speech representation 145, 145a-n of the corresponding candidate transcription 135a-n. For instance, the ITS module 140 may convert text from each candidate transcription 135 into the corresponding synthesized speech representation 145.

At stage (E), the computing system 120 provides, as feature inputs to an agreement score determiner 150, the video data 114 representing the motion of the lips of the user 10 and the synthesized speech representation 145 output from the ITS module 140 for each candidate transcription 135. In turn, the agreement score determiner 150 is configured to determine, as feature outputs, the agreement scores 155, 155a-n for the candidate transcriptions 135a-n. The agreement score determiner 150 may determine the agreement scores 155 in parallel, determine each agreement score 155 individually, or a combination thereof.

Prior to determining the agreement scores 155, the agreement score determiner 150 may initially process each synthesized speech representation 145 and the video data 114 to time-align each synthesized speech representation 145 with the video data 114. That is, the agreement score determiner 150 may apply any technique to identify and mark frames in the video data 114 that contains motion of the lips of the user 10 while speaking the utterance 101, and time-align each synthesized speech representation 145 with the video data 114 using the identified and marked frames.

In the example shown, the agreement score determiner 150 includes an agreement score model 152 (FIG. 3) trained to predict an agreement score 155 for a corresponding candidate transcription 135 based on a degree that a synthesized speech representation 145 of the corresponding candidate transcription 135 matches the motion of the lips of the user 10 speaking the utterance 101. In essence, the agreement score model 152 is trained to discern between synthesized speech representations 145 that match video data 114 representing motion of lips and synthesized speech representations 145 that do not match video data 114 representing motion of lips.

In some examples, the agreement scores 155 output from the agreement score determiner 150 (i.e., using the agreement score model 152) include binary values, where "1" denotes a synthesized speech representation 145 that matches motion of the lips of the user 10 represented by video data 114, and "0" denotes a synthesized speech representation that does not match motion of the lips of the user 10 represented by video data 114. In additional examples, the agreement scores 155 are numerical values, e.g., from zero to one, indicative of the degree that a synthesized speech representation 145 of the corresponding candidate transcription 135 matches the motion of the lips. For instance, agreement scores 155 with values closer to one are more indicative of synthesized speech representations 145 that match the motion of the lips than agreement scores 155 with values closer to zero. In some scenarios, an agreement score 155 having a value that satisfies (e.g., exceeds) an agreement score threshold is indicative of a synthesized speech representation 145 matching the motion of the lips of a user 10 speaking an utterance 101. In these scenarios, binary values representative of the agreement scores 155 may be output from the agreement score determiner 150 based on whether or not initial numerical values satisfy the agreement score threshold.

By indicating how well a synthesized speech representation 145 for a given candidate transcription 135 matches the motion of the lips of the user 10 in the video data 114, each agreement score 155 represents a re-scoring of the multiple candidate transcriptions 135 identified at stage (C). The degree that video data 114 representing the motion of the lips of the user 10 matches a synthesized speech representation 145 of the candidate transcription 135 may be based on, for example, whether a sequence of phonetic features in the synthesized speech representation 145 completely or partially matches a sequence of lip positions and shapes of the user 10 in the video data 114. For instance, at a given time instance, the model 152 would identify a match when the lip position/shape of the user 10 is indicative of the user's mouth being open while the synthesized speech representation 145 is pronouncing a vowel. Similarly, if at another time instance, the agreement score model 152 would not identify a match when the lip position of the user 10 is indicative of the user's mouth being open while the synthesized speech representation 145 is pronouncing a "B" consonant.

Figure 3:
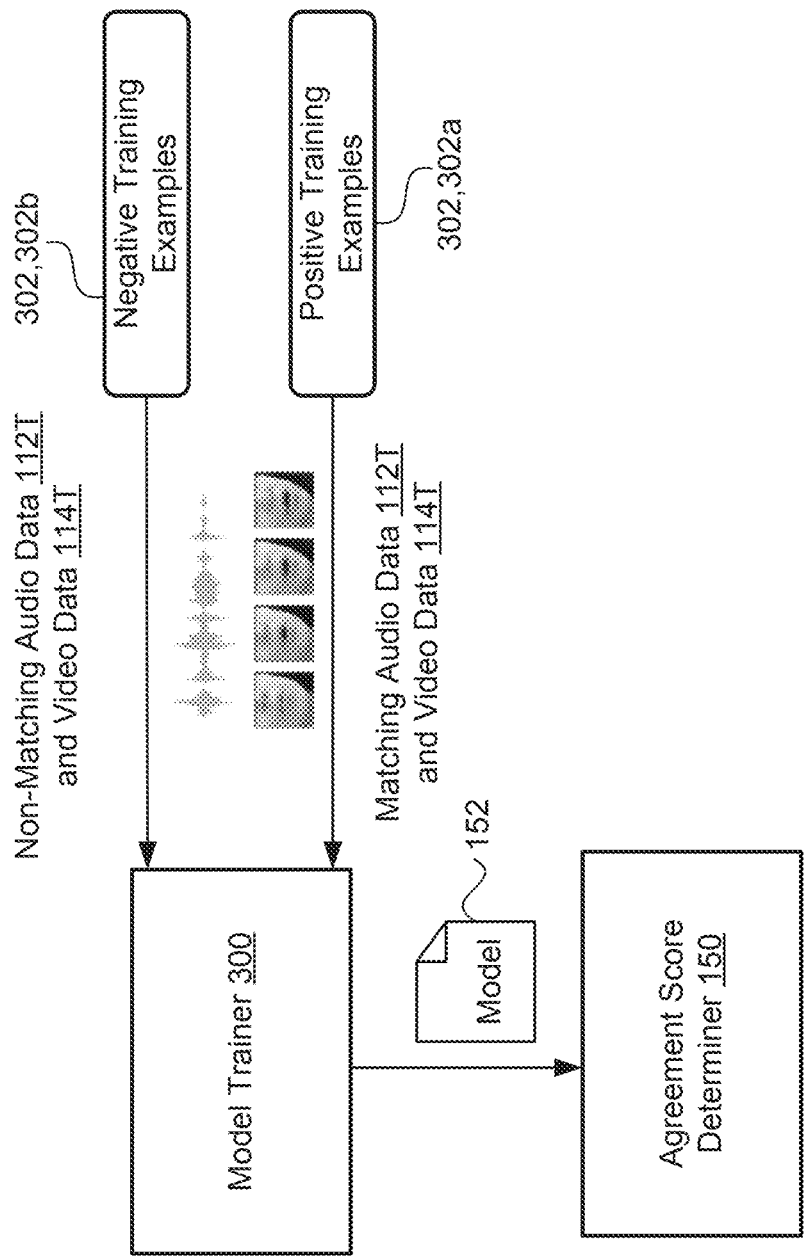
FIG. 3 is a schematic view of an example model trainer.

FIG. 3 shows an example model trainer 300 for generating the agreement score model 152. In the example shown, the model trainer 300 is trained on a plurality of training examples 302 that include positive training examples 302a and negative training examples 302b. Each positive training example 302a contains training audio data 112T representing an utterance of speech and training video data 114T representing motion of lips of a speaker that matches (e.g., is synchronized with) the utterance of speech. That is, the model trainer 300 feeds the agreement score model 152 positive training examples 302a to teach the agreement score determiner 150 examples where the agreement score determiner 150 should output agreement scores 155 indicating a match/synchronization between synthesized speech representations and motion/movement of lips in video data 114.

By contrast, each negative training example 302b contains training audio data 112T representing an utterance of speech and training video data 114T representing motion of lips of a speaker that does not match (e.g., is not synchronized with) the utterance of speech. That is, the model trainer 300 feeds the agreement score model 152 negative training examples 302b to teach the agreement score determiner 150 examples where the agreement score determiner 150 should output agreement scores 155 indicating no match and no synchronization between synthesized speech representations and motion/movement of lips in video data 114.

By training the model trainer 300 on the positive training examples 302a and the negative training examples 302b to generate the agreement score model 152, the agreement score determiner 150 is taught to discern between synthesized speech representations that match/synchronize with motion of the lips represented by video data 114 and synthesized speech representations 145 that do not match or synchronize with the motion/movement of the lips represented by the video data 114. Accordingly, the agreement score determiner 150 can use the trained agreement score model 152 to generate an agreement score 155 that indicates the degree that the synthesized speech representation 145 of a corresponding candidate transcription 135 matches the motion of the lips represented by the video data 114.

In some examples, the training audio data 112T includes human-generated utterances of speech 101. In other examples, the training audio data 112T includes synthesized utterances 145 (e.g., generated by the TTS module 140). In yet other examples, the training audio data 112T includes both synthesized utterances 145 and human-generated utterances 101.

In some configurations, the model trainer 300 is configured to segregate training examples 302 into training and evaluation sets (e.g., 90% training and 10% evaluation.) With these sets, the model trainer 300 trains the agreement score model 152 with the training examples 302 until a performance of the agreement score model 152 on the evaluation set stops decreasing. Once the performance stops decreasing on the evaluation set, the agreement score model 152 is ready for modeling where the agreement score model 152 allows the agreement score determiner 150 output agreement scores 155 each indicating a likelihood that a synthesized speech representation 145 of a corresponding candidate transcription 135 matches the motion of lips of a user 10 while the user speaks an utterance 101.

Referring back to FIG. 1, the agreement scores 155, 155a-n for the multiple candidate transcriptions 135 include 0.4 for "Write", 0.7 for"Bite", 0.3 for "Sight", 0.4 for "Night", and 0.9 for "Kite". Here, the candidate transcription 135 of "Kite" includes the highest agreement score 155, and is in fact, the word actually spoken by the user 10 in the utterance 101. At stage (F), the re-ranker 160 receives, from the agreement score determiner 150, the agreement scores 155 for the multiple candidate transcriptions 135 and outputs a re-ranked result 165 of the multiple candidate transcriptions 135 based on the agreement scores 155. In the example shown, the multiple candidate transcriptions 135 are re-ranked from highest agreement scores 155 to lowest agreement scores 155. Thus, the computing system 120 (e.g., via the re-ranker 160) produces the re-ranked result 165 associated with a new ranking that is different than the initial/original ranking indicated by the speech recognizer module 130 based on the audio data 112 alone.

In some examples, in the event of a tie between two or more candidate transcriptions 135 having a same agreement score 155, the candidate transcription 135 associated with a higher ranking identified at stage (C) may be ranked higher by the re-ranker 160 in the re-ranked result 165. That is, the re-ranker 160 may consider speech recognition features associated with the multiple candidate transcriptions 135 generated by the speech recognizer module 130. Speech recognition features may include information produced by a language model at the speech recognizer 130 for a given candidate transcription, such as a language model probability, a position within a ranking, a number of tokens, or a confidence score from the speech recognizer module 130. In the event of a tie, the re-ranker 160 may additionally take into consideration sematic features and/or speech recognition features. Semantic features may indicate information about of pattern matching analysis, for example, matching a candidate transcription to a grammar. For example, if a candidate transcription matches a popular voice action pattern, it has a better chance to be correct recognition. Many voice queries are commands, such as "show me movies by Jim Carey" or "open web site".

At stage (G), the computing system 120 receives the re-ranked result 165 and selects, from among the multiple candidate transcriptions 135 for the utterance 101, the candidate transcription 135 associated with the highest agreement score 145 as the speech recognition output 175 for the utterance 101. In the example shown, the candidate transcription 135 for the word "Kite" includes the highest agreement score equal to "0.9", and is therefore selected as the speech recognition output 175 for the utterance 101.

During stage (H), the computing system 120 provides the speech recognition output 175 to the client device 110 over the network 118. The client device 110 may then display the speech recognition output 175 on a screen of the client device 110 and/or use the speech recognition output 175 to perform an action/command. For example, the client device 110 may submit the speech recognition output 175 as a search query or use the output 175 in another manner. In additional examples, the computing system 120 provides the speech recognition output 175 directly to another system to perform an action/command related to the speech recognition output 175. For instance, the computing system 120 may provide the speech recognition output 175 to a search engine to perform a search query using the speech recognition output 175.

While the candidate transcriptions 135 illustrated in FIG. 1 are depicted as individual words for simplicity, it should be understood that the multiple candidate transcriptions 135 and synthesized speech representations 145 produced therefrom may include multiple words contained in an utterance 101 of one or more phrases, one or more sentences, or even in longer-form utterances recorded from a meeting or lecture. For example, the audio data 112 and video data 114 may represent an entire query spoken by the user, and each of the candidate transcriptions 135 may be a respective candidate transcription for the audio data 112 as a whole.

The computing system 120 may include data processing hardware (e.g., a processor) 510 (FIG. 5) and memory hardware 520 (FIG. 5) in communication with the data processing hardware 510 and storing instructions that when executed on the data processing hardware cause the data processing hardware 510 to perform operations. For instance, the data processing hardware 510 may execute the speech recognizer module 130, the TTS module 140, the agreement score determiner 150, and the re-ranker 160. In some implementations, the entire functionality of the computing system 120 resides on-device on the client device 110. Advantageously, latency may be improved since the client device 110 does not have to transmit the audio and video data 112, 114 over a network 118 and wait to receive the resulting speech recognition output 175.

In some implementations, the functionality of the computing system 120 described in FIG. 1 is partitioned among the client device 110 and the computing system 120, whereby some operations are performed on the client device 110 while other operations are performed remotely on the computing system 120. For example, audio data analysis may be performed on the computing system 120 (e.g., cloud computing environment) such that the client device 110 provides the audio data 112 to the speech recognizer module 130 to obtain the multiple candidate transcription candidates 135 for the utterance 101 and the TTS module 140 may generate the corresponding synthesized speech representation 145 for each candidate transcription 135 of the multiple candidate transcription candidates 135 for the utterance 101. Instead of providing the video data 114 representing the motion of the lips of the user 10 as the user 10 speaks the utterance 101, the client device 110 may execute the agreement score determiner 150 on-device. Thus, the computing system 120 may transmit the synthesized speech representations 145 for the multiple candidate transcriptions 135 to the client device 110 via the network 118, whereby the client device 110 is configured to obtain the video data 114 and determine the agreement score 155 for each candidate transcription 135 of the multiple candidate transcriptions 135 received from the computing system. As described in detail above, each agreement score 155 indicates the likelihood that the synthesized speech representation 145 of the corresponding candidate transcription 135 matches the motion of the lips of the user 10 while the user 10 speaks the utterance 101. The client device 110 may then select one of the multiple candidate transcriptions 135 (e.g., the one associated with the highest agreement score 155) as the speech recognition output 175 based on the agreement scores determined on-device.

With this configuration, bandwidth requirements are reduced since the video data 114 is retained on the client device 110 without the need to transmit the video data 114 over the network 118 to the remote computing system 120. Further, if the video data 114 were transmitted over the network 118, the video data 114 would likely need to be compressed by the client device 110 prior to transmission, thereby reducing the quality of the video data 114. Therefore, another advantage of retaining the video data 114 and performing the video data matching on-device is that the video data matching may use uncompressed (highest quality) video data 114. That is, the use of uncompressed video data makes it easier to recognize matches/mismatches between the synthesized speech representations 145 and the video data 114.

Each of the multiple candidate transcriptions 135 output by the speech recognizer module 130 for the utterance 101 may be associated with a same language. In some examples, at least one of the multiple candidate transcriptions 135 for the utterance 101 is associated with a different language than the other candidate transcriptions 135. For instance, the computing system 120 may not know the language of the utterance 101 a priori, and may rely on the speech recognizer module 130 to use different language models to output multiple candidate transcriptions 135 divided between two or more different languages. In this scenario, the candidate transcription 135 associated with the correct language of the utterance 101 is identified/selected by comparing the corresponding synthesized speech representations 145 to the video data 114 representing the motion of the lips of the user 10 while speaking the utterance 101. That is, the language of the candidate transcription 135 associated with a highest agreement score 155 may be selected as the speech recognition output 175 to identify the correct language. Since the video data 114 has been used to determine the best-matching synthesized speech representation 145, it is more likely that the associated candidate transcription 135 will be in the correct language.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Figure 4:
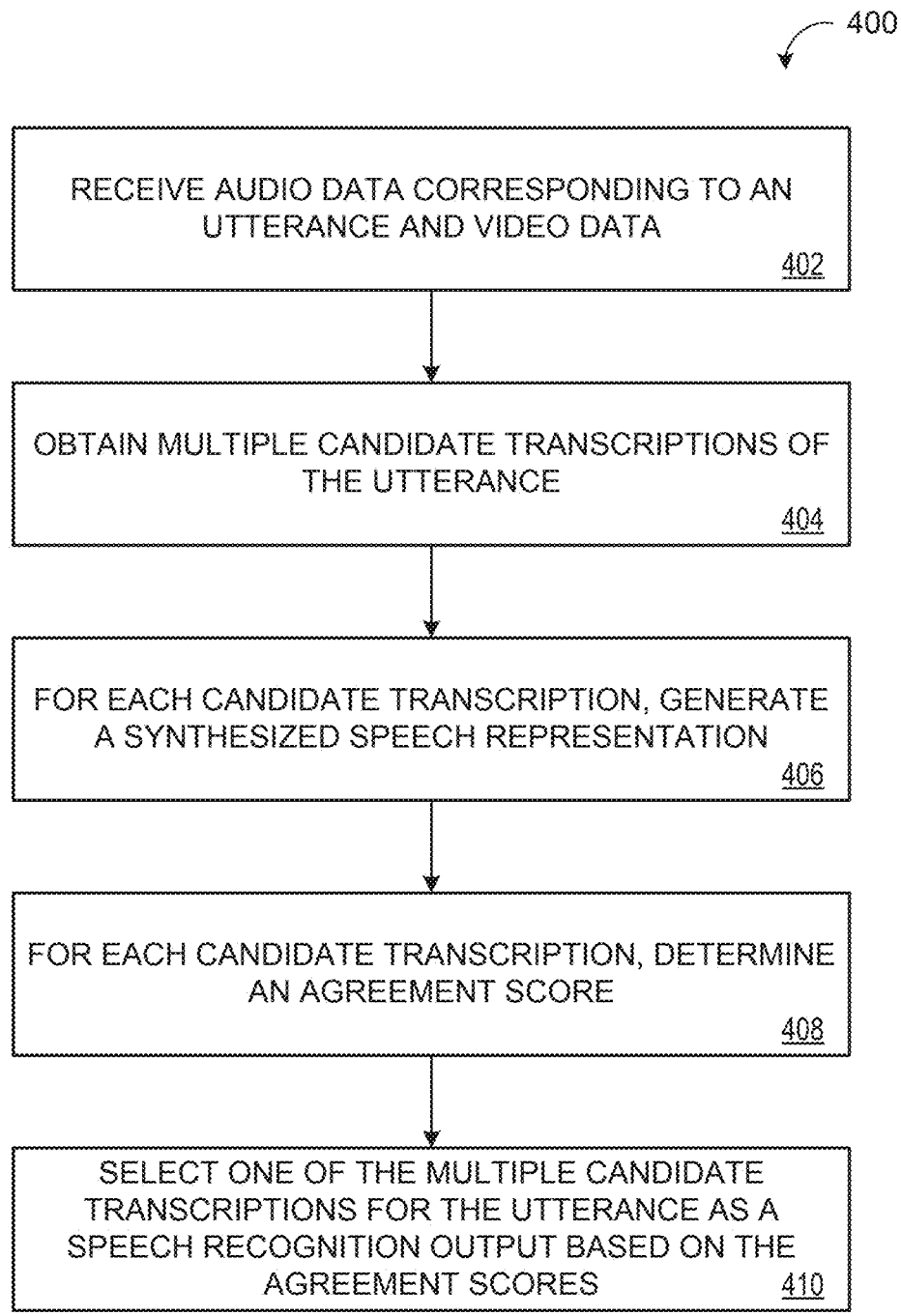
FIG. 4 is a flowchart of an example arrangement of operations for a method of improving automated speech recognition.

FIG. 4 is a flowchart of an example arrangement of operations for a method 400 of rescoring candidate transcriptions using audio-visual matching. At operation 402, the method 400 includes receiving, at data processing hardware 510, audio data 112 corresponding to an utterance 101 spoken by a user 10 and video data 114 representing motion of lips of the user 10 while the user 10 was speaking the utterance 101. At operation 404, the method 400 includes obtaining, by the data processing hardware 510, multiple candidate transcriptions 135 for the utterance 101 based on the audio data 112. At operation 406, for each candidate transcription 135, the method 400 also includes generating, by the data processing hardware 510, a synthesized speech representation 145 of the corresponding candidate transcription 135. At operation 408, for each candidate transcription 135, the method 400 also includes determining, by the data processing hardware, an agreement score 155 indicating a likelihood that the synthesized speech representation 145 of the corresponding candidate transcription 135 matches the motion of the lips of the user 10 while the user 10 speaks the utterance 101. At operation 410, the method 400 includes selecting, by the data processing hardware 510, one of the multiple candidate transcriptions 135 for the utterance 101 as a speech recognition output 175 based on the agreement scores 155 determined for the multiple candidate transcriptions 135 for the utterance 101.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
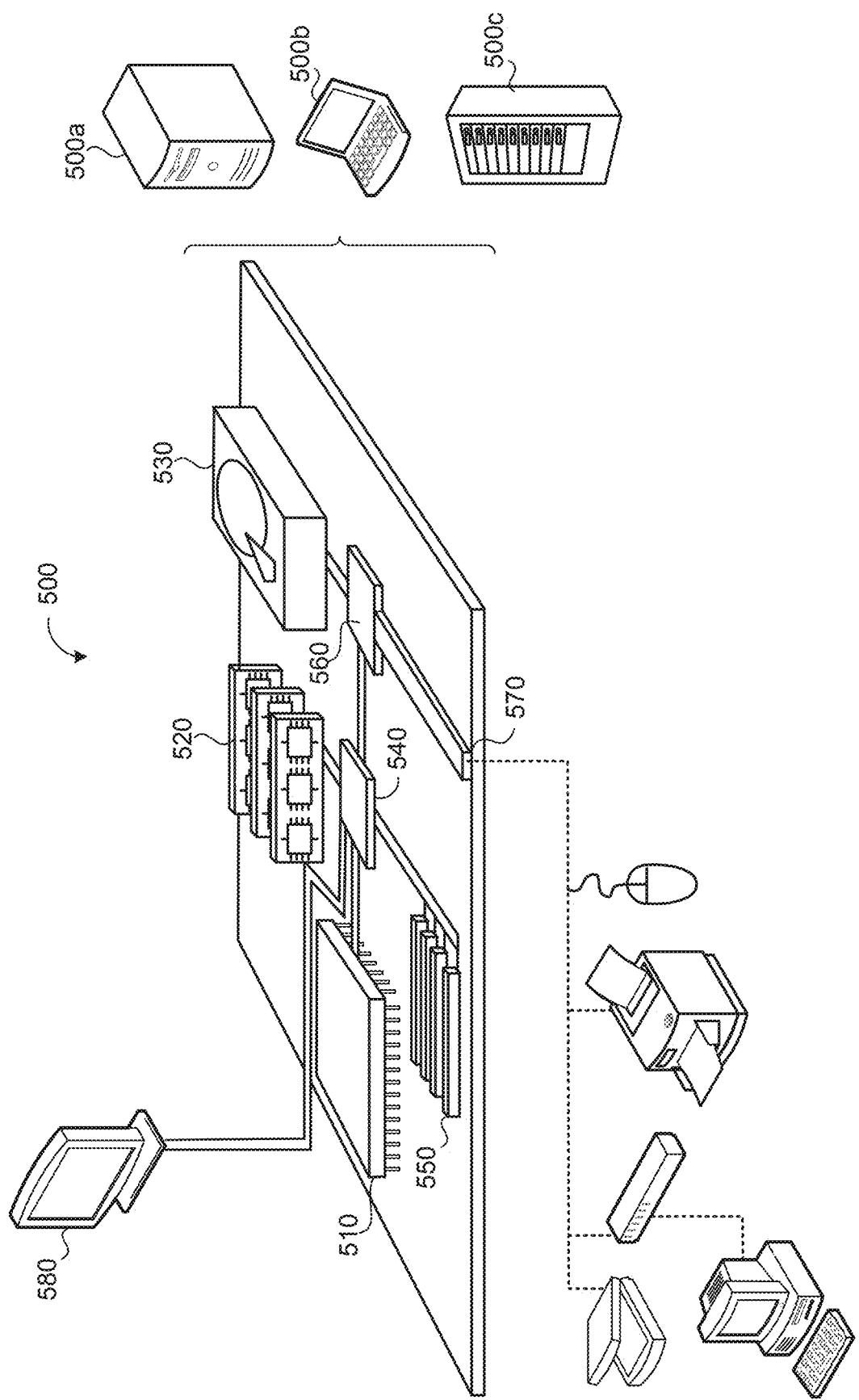
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, audio data corresponding to an utterance spoken by a user;
receiving, at the data processing hardware, video data representing a sequence of lip positions and shapes of the user while the user was speaking the utterance;
obtaining, by the data processing hardware, multiple candidate transcriptions for the utterance based on the audio data;
for each candidate transcription of the multiple candidate transcriptions for the utterance:
generating, by the data processing hardware, a synthesized speech representation of the corresponding candidate transcription; and
determining, by the data processing hardware, an agreement score indicating a likelihood that a sequence of phonetic features in the synthesized speech representation of the corresponding candidate transcription is synchronized with the sequence of lip positions and shapes of the user represented by the video data while the user was speaking the utterance; and
selecting, by the data processing hardware, one of the multiple candidate transcriptions for the utterance as a speech recognition output based on the agreement scores determined for the multiple candidate transcriptions for the utterance.

2. The method of claim 1, wherein determining the agreement score comprises:
providing, to an agreement score model, the synthesized speech representation of the corresponding candidate transcription and the video data representing the sequence of lip positions and shapes of the user as feature inputs; and
determining, from the agreement score model, as a feature output, the agreement score based on a degree that the sequence of phonetic features in the synthesized speech representation of the corresponding candidate transcription is synchronized with the sequence of lip positions and shapes of the user.

3. The method of claim 2, wherein the agreement score model is trained on a plurality of training examples comprising:
   positive training examples comprising audio data representing utterances of speech and video data representing sequences of lip positions and shapes of speakers that match the utterances of speech; and
   negative training examples comprising audio data representing utterances of speech and video data representing sequences of lip positions and shapes of speakers that do not match the utterances of speech.

4. The method of claim 1, wherein selecting one of the multiple candidate transcriptions for the utterance as the speech recognition output comprises selecting, from among the multiple candidate transcriptions for the utterance, the candidate transcription associated with the highest agreement score as the speech recognition output for the utterance.

5. The method of claim 1, wherein obtaining the multiple candidate transcriptions for the utterance comprises:
   generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct;
   ranking the candidate transcriptions in the initial set of candidate transcriptions based on the likelihood scores; and
   determining the multiple candidate transcriptions for the utterance as the N-candidate transcriptions in the initial set of candidate transcriptions associated with the highest likelihood scores, the identified multiple candidate ranked according to the associated likelihood scores.

6. The method of claim 5, further comprising, prior to selecting one of the multiple transcriptions for the utterance, re-ranking, by the data processing hardware, the multiple candidate transcriptions for the utterance based on the agreement scores determined for the multiple candidate transcriptions for the utterance.

7. The method of claim 1, wherein obtaining the multiple candidate transcriptions for the utterance comprises:
   generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct;
   identifying two or more candidate transcriptions in the initial set of candidate transcriptions that are associated with likelihood scores that satisfy a likelihood threshold; and
   determining the multiple candidate transcriptions for the utterance as the identified two or more candidate transcriptions in the initial set of candidate transcriptions that are associated with likelihood scores that satisfy the likelihood threshold.

8. The method of claim 1, wherein each of the multiple candidate transcriptions for the utterance are associated with a same language.

9. The method of claim 1, wherein at least one of the multiple candidate transcriptions for the utterance is associated with a different language than the other multiple candidate transcriptions.

10. The method of claim 1, wherein receiving the audio data corresponding to the utterance spoken by the user comprises receiving the audio data from a client device associated with the user, the client device in communication with one or more audio capture devices configured to capture the audio data corresponding to the utterance.

11. The method of claim 10, wherein the data processing hardware resides on the client device.

12. The method of claim 10, wherein the client device is remote from the data processing hardware and communicates with the data processing hardware via a network.

13. The method of claim 10, wherein receiving the video data representing the sequence of lip positions and shapes of the user while the user was speaking the utterance comprises receiving the video data from the client device associated with the user, the client device comprising one or more video capture devices configured to record the video data representing the sequence of lip positions and shapes of the user while the user was speaking the utterance.

14. A system comprising:
   data processing hardware; and
   memory hardware in communication with the data processing hardware, the memory hardware storing instructions that when executed on the data processing hardware cause the data processing hardware to perform operations comprising:
      receiving audio data corresponding to an utterance spoken by a user;
      receiving video data representing a sequence of lip positions and shapes of the user while the user was speaking the utterance;
      obtaining multiple candidate transcriptions for the utterance based on the audio data;
      for each candidate transcription of the multiple candidate transcriptions for the utterance:
         generating a synthesized speech representation of the corresponding candidate transcription; and
         determining an agreement score indicating a likelihood that a sequence of phonetic features in the synthesized speech representation of the corresponding candidate transcription is synchronized with the sequence of lip positions and shapes of the user represented by the video data while the user was speaking the utterance; and
      selecting one of the multiple candidate transcriptions for the utterance as a speech recognition output based on the agreement scores determined for the multiple candidate transcriptions for the utterance.

15. The system of claim 14, wherein determining the agreement score comprises:
   providing, to an agreement score model, the synthesized speech representation of the corresponding candidate transcription and the video data representing the sequence of lip positions and shapes of the user as feature inputs; and
   determining, from the agreement score model, as a feature output, the agreement score based on a degree that the sequence of phonetic features in the synthesized speech representation of the corresponding candidate transcription is synchronized with the sequence of lip positions and shapes of the user.

16. The system of claim 15, wherein the agreement score model is trained on a plurality of training examples comprising:
   positive training examples comprising audio data representing utterances of speech and video data representing sequences of lip positions and shapes of speakers that match the utterances of speech; and
   negative training examples comprising audio data representing utterances of speech and video data representing sequences of lip positions and shapes of speakers that do not match the utterances of speech.

17. The system of claim 14, wherein selecting one of the multiple candidate transcriptions for the utterance as the speech recognition output comprises selecting, from among the multiple candidate transcriptions for the utterance, the candidate transcription associated with the highest agreement score as the speech recognition output for the utterance.

18. The system of claim 14, wherein obtaining the multiple candidate transcriptions for the utterance comprises:
generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct;
ranking the candidate transcriptions in the initial set of candidate transcriptions based on the likelihood scores; and
determining the multiple candidate transcriptions for the utterance as the N-candidate transcriptions in the initial set of candidate transcriptions associated with the highest likelihood scores, the identified multiple candidate ranked according to the associated likelihood scores.

19. The system of claim 18, wherein the operations further comprise, prior to selecting one of the multiple transcriptions for the utterance, re-ranking the multiple candidate transcriptions for the utterance based on the agreement scores determined for the multiple candidate transcriptions for the utterance.

20. The system of claim 14, wherein obtaining the multiple candidate transcriptions for the utterance comprises:
generating, using a speech recognizer module, an initial set of candidate transcriptions for the utterance based on the audio data, each candidate transcription in the initial set of candidate transcriptions associated with a corresponding likelihood score indicating a likelihood that the candidate transcription is correct;
identifying two or more candidate transcriptions in the initial set of candidate transcriptions that are associated with likelihood scores that satisfy a likelihood threshold; and
determining the multiple candidate transcriptions for the utterance as the identified two or more candidate transcriptions in the initial set of candidate transcriptions that are associated with likelihood scores that satisfy the likelihood threshold.

21. The system of claim 14, wherein each of the multiple candidate transcriptions for the utterance are associated with a same language.

22. The system of claim 14, wherein at least one of the multiple candidate transcriptions for the utterance is associated with a different language than the other multiple candidate transcriptions.

23. The system of claim 14, wherein receiving the audio data corresponding to the utterance spoken by the user comprises receiving the audio data from a client device associated with the user, the client device in communication with one or more audio capture devices configured to capture the audio data corresponding to the utterance.

24. The system of claim 23, wherein the data processing hardware resides on the client device.

25. The system of claim 23, wherein the client device is remote from the data processing hardware and communicates with the data processing hardware via a network.

26. The system of claim 23, wherein receiving the video data representing the sequence of lip positions and shapes of the user while the user was speaking the utterance comprises receiving the video data from the client device associated with the user, the client device comprising one or more video capture devices configured to record the video data representing the sequence of lip positions and shapes of the user while the user was speaking the utterance.

* * * * *